R. J. OTEY.
CATTLE GUARD.
APPLICATION FILED OCT. 7, 1911.
1,017,014.
Patented Feb. 13, 1912.
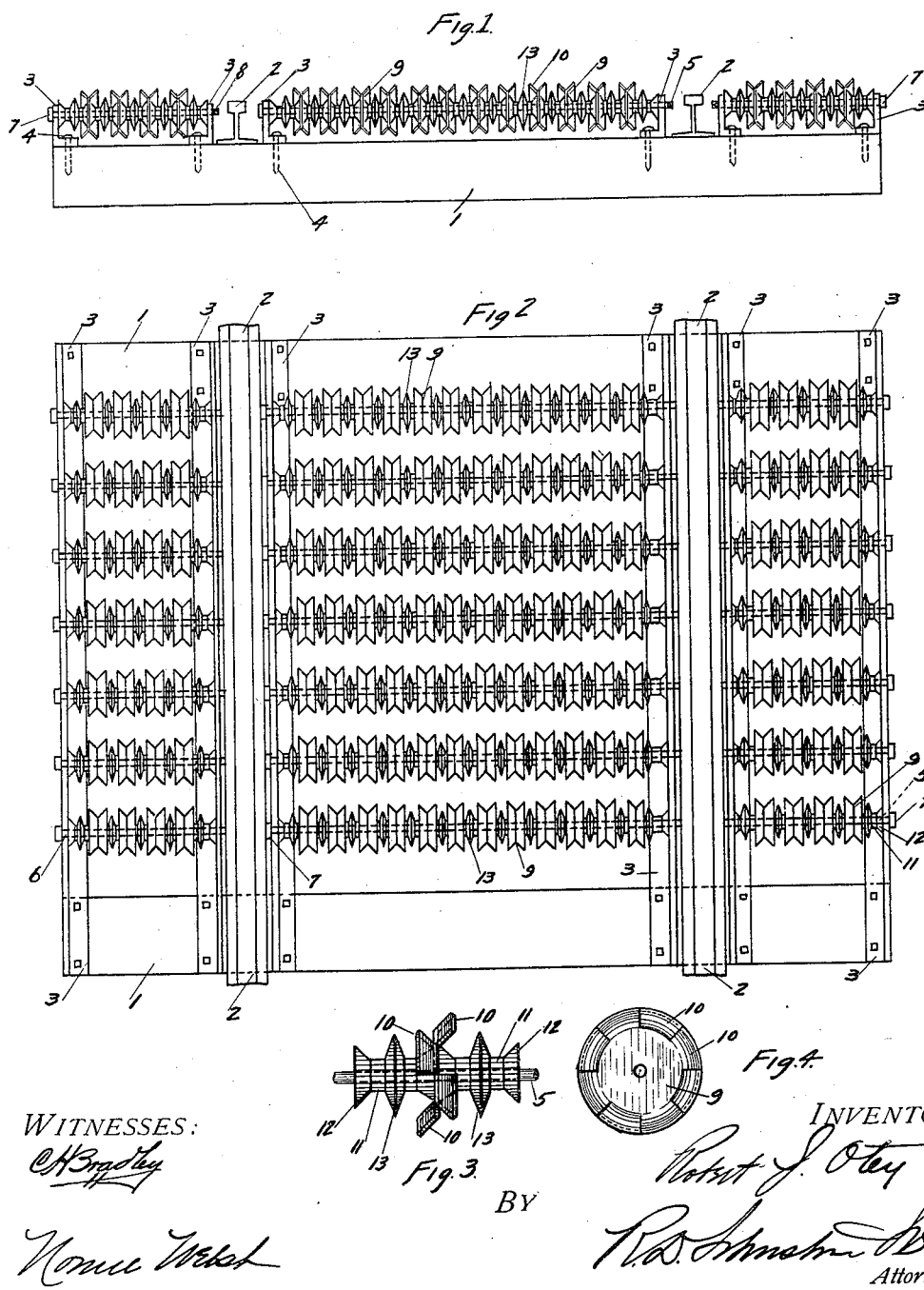

UNITED STATES PATENT OFFICE.

ROBERT J. OTEY, OF BIRMINGHAM, ALABAMA.

CATTLE-GUARD.

1,017,014.      Specification of Letters Patent.      Patented Feb. 13, 1912.

Application filed October 7, 1911. Serial No. 653,454.

*To all whom it may concern:*

Be it known that I, ROBERT J. OTEY, a citizen of the United States of America, residing at Birmingham, in the county of Jefferson and State of Alabama, have invented certain new and useful Improvements in Cattle-Guards, of which the following is a specification.

My invention relates to improvements in cattle guards and has for its object to produce, at a comparatively small expense, a guard which will not only stop cattle, but hogs and sheep, this object being primarily obtained by the provision of disks formed of sheet steel having their peripheries radially slotted and adapted to present sharp irregular surfaces by having the tongues of metal between slits alternately bent in opposite directions.

A further feature of my invention consists in spacing the disks formed as above by spools provided with centrally sharpened disks which catch the hoofs of smaller animals that might otherwise pass in between the disks and coöperate with the latter in making the guard effective against all kinds of animals.

My invention further comprises the details of construction and arrangement of parts hereinafter more particularly described and claimed, reference being had to the accompanying drawings, in which:—

Figure 1 represents a transverse cross-sectional view through the track showing my cattle guard in end elevation. Fig. 2 is a plan view of my improved cattle guard. Fig. 3 is an enlarged detail sectional view of the disk and spacer, and Fig. 4 is an end elevation of the disk.

Similar reference numerals refer to similar parts throughout the drawings.

I have shown my cattle guard installed in connection with the cross ties 1 and rails 2 of the usual track construction. On each side of the rails 2 and parallel therewith I place angle irons 3 and connect them to the ties by spikes 4, or in any other suitable manner. Also at the outer ends of the cross ties I provide similar angle irons 3 and fasten them to the ties. These angle irons serve as bearings for a series of equi-distantly spaced rods 5 between the rails and rods 6 at the outside of the rails. These rods are mounted in the vertical flanges of the irons 3 and are held in place by a nut 7 at one end and key 8 at the other end of each rod. I mount upon each rod a series of disks 9 preferably formed from sheet metal with a central opening to receive the rod and with equi-distantly spaced radial slits extending a short distance from the periphery to produce metal tongues 10 which are adapted to be bent alternately in opposite directions in order that the disks may present an irregular roughened rotatable surface, the periphery of which, due to the bending out of the tongues, covers a space of several inches of the rod. These disks are spaced by metal spools 11 which have flanged ends 12 to increase their bearing surfaces against the central portions of the disks 9, and which have at their center sharpened beveled cutting edges 13, which have a diameter approximately equal with the solid uncut central portion of the disks 9. These cutting edges 13 are spaced equi-distantly between the adjacent peripheries of the disks 9.

The apparatus when assembled presents a series of transverse sets of roughened disks 9 with their sharpened irregular peripheries and sharpened cutting disks exposed between said peripheries of the disks, the transverse rows of disks being spaced relatively any desired distance. I prefer to have the earth and ballast removed from under the disks to a sufficient extent to cause the bodies of smaller animals, such as hogs and sheep, when they attempt to step between the rows of disks, to strike against the tongues 10 on the disks, which will effectively stop the animals and prevent any further attempt to cross the cattle guard.

Having thus described my invention, what I claim as new and desire to secure by Letters Patent, is:—

1. A cattle guard comprising a series of disks each having its periphery slitted and the cut portions bent at an angle to the body of the disk, alternate portions being bent in opposite directions, and means to rotatably support said disks in spaced relationship, substantially as described.

2. In a cattle guard, the combination of a series of shafts, of a series of sheet metal disks mounted on said shafts, spacer sleeves on the shafts having a centrally disposed annular sharpened projection, the peripheries of said disks being slitted and bent outwardly to present irregular angularly disposed tongues, substantially as described.

3. In a cattle guard, a section thereof comprising end bearings, shafts mounted in said bearings, a series of metal disks mounted thereon, spools interposed between the disks to space them and provided with sharp annular cutting edges, said disks having the metal in their peripheries displaced to give irregular portions which overhang said spools, substantially as described.

4. In a cattle guard, the combination of a series of shafts and means to support same, of a series of sheet metal disks mounted on each shaft, means to space said disks which have their peripheries distorted to provide angularly disposed portions which overhang the spacing means between the disks, substantially as described.

5. In a cattle guard, a series of juxtaposed sheet metal disks having their peripheries radially slitted and the tongues between the slits bent alternately in opposite directions at an angle to the body of the disks, and means to assemble said disks in spaced relationship, substantially as described.

In testimony whereof I affix my signature in presence of two witnesses.

ROBERT J. OTEY.

Witnesses:
NOMIE WELSH,
R. D. JOHNSTON, Jr.

Copies of this patent may be obtained for five cents each, by addressing the "Commissioner of Patents, Washington, D. C."